US012682349B2

(12) United States Patent
Eloul et al.

(10) Patent No.: US 12,682,349 B2
(45) Date of Patent: Jul. 14, 2026

(54) ZERO-KNOWLEDGE DISTRIBUTED LEDGERS WITH CONFIDENTIAL ASSETS AND INTER-ASSET AUDITING CAPABILITIES

(71) Applicant: JPMORGAN CHASE BANK, N.A., New York, NY (US)

(72) Inventors: Shaltiel Eloul, London (GB); Yash Satsangi, Tilburg (NL); Anthony Klausing, Chicago, IL (US); Sudhir Upadhyay, Edison, NJ (US); Marco Pistoia, Amawalk, NY (US); Georgios Papadopoulos, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 99 days.

(21) Appl. No.: 18/442,989

(22) Filed: Feb. 15, 2024

(65) Prior Publication Data

US 2025/0217802 A1      Jul. 3, 2025

(30) Foreign Application Priority Data

Dec. 28, 2023    (GR) ............................... 20230101083

(51) Int. Cl.
G06Q 20/40 (2012.01)
(52) U.S. Cl.
CPC .................................. G06Q 20/401 (2013.01)
(58) Field of Classification Search
CPC .................................................. G06Q 20/401
See application file for complete search history.

(56) References Cited

U.S. PATENT DOCUMENTS

2019/0229918 A1* 7/2019 Naqvi ................... H04L 9/3218
2021/0073913 A1* 3/2021 Ingargiola ............... H04L 63/12
(Continued)

OTHER PUBLICATIONS

Narula et al., zkLedger: Privacy-Preserving Auditing for Distributed Ledgers, 2018 (Year: 2018).*

(Continued)

*Primary Examiner* — Hieu T Hoang
(74) *Attorney, Agent, or Firm* — GREENBERG TRAURIG LLP

(57) ABSTRACT

A method may include: a broadcaster computer program generating, for participants in a network in a transaction, a commit, an audit token, and a proof of consistency; the broadcaster computer program broadcasting, the commits, the audit tokens, and the proofs of consistency for each participant to all participants in the network; the participant computer programs generating complimentary commits, complimentary audit tokens, complementary proofs of consistency, proofs of equivalency, and a proof of assets; the broadcaster computer program receiving from each of the participant computer programs, the proof of assets, the complimentary commit, the complimentary audit token, the complementary proof of consistency, and the proof of equivalency; the broadcaster computer program and/or the participant computer programs verifying, the proofs of assets, the proofs of balance, the proofs of consistency, and the proofs of equivalency; and the broadcaster computer program approving the transaction based on the verification.

19 Claims, 4 Drawing Sheets

(56)　　　　　　　References Cited

U.S. PATENT DOCUMENTS

| | | | |
|---|---|---|---|
| 2022/0158842 A1 * | 5/2022 | Camenisch | .......... H04L 9/3257 |
| 2023/0267220 A1 * | 8/2023 | El Khiyaoui | ........ H04L 9/3252 |
| | | | 726/26 |

OTHER PUBLICATIONS

International Search Report and Written Opinion of the International Searching Authority, dated Apr. 7, 2025, from corresponding International Application No. PCT/US2024/060380.

Narula, Neha; et al., "zkLedger: Privacy-Preserving Auditing for Distributed Ledgers", IACR, International Association for Cryptologic Research, vol. 20180305:160501, Mar. 2, 2018.

Kang, Hui; et al., "FabZK: Supporting Privacy-Preserving, Auditable Smart Contracts in Hyperledger Fabric", 2019 49th Annual IEEE/IFIP International Conference on Dependable Systems and Networks (DSN), IEEE, Jun. 24, 2019 (Jun. 24, 2019), pp. 543-555.

Partala, Juha; et al., "Non-Interactive Zero-Knowledge for Blockchain: A Survey", IEEE Access, IEEE, USA, vol. 8, Dec. 21, 2020 (Dec. 21, 2020), pp. 227945-227961.

* cited by examiner

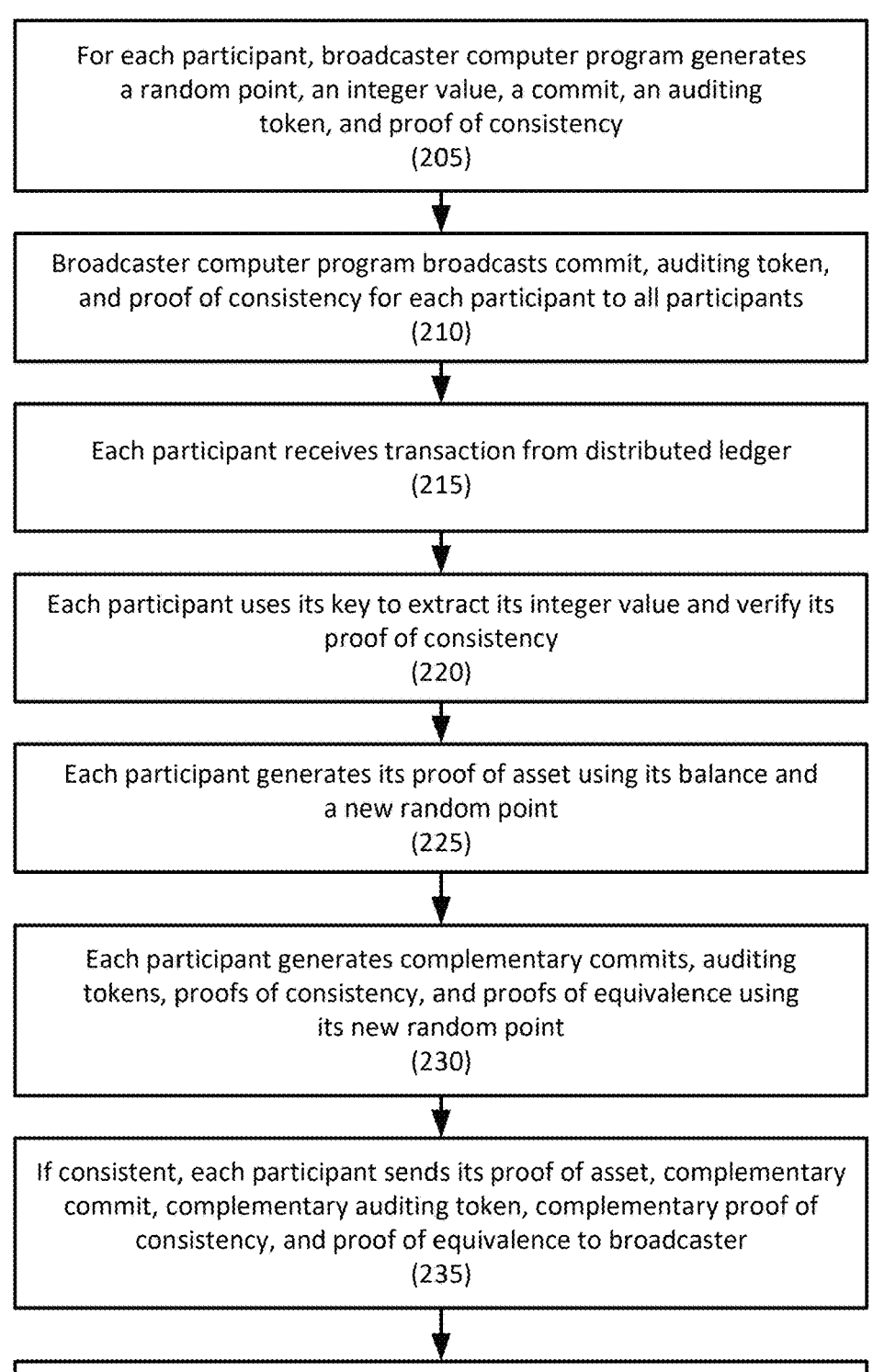

For each participant, broadcaster computer program generates a random point, an integer value, a commit, an auditing token, and proof of consistency
(205)

Broadcaster computer program broadcasts commit, auditing token, and proof of consistency for each participant to all participants
(210)

Each participant receives transaction from distributed ledger
(215)

Each participant uses its key to extract its integer value and verify its proof of consistency
(220)

Each participant generates its proof of asset using its balance and a new random point
(225)

Each participant generates complementary commits, auditing tokens, proofs of consistency, and proofs of equivalence using its new random point
(230)

If consistent, each participant sends its proof of asset, complementary commit, complementary auditing token, complementary proof of consistency, and proof of equivalence to broadcaster
(235)

Broadcaster computer program verifies proofs
(240)

FIGURE 2

ZERO-KNOWLEDGE DISTRIBUTED LEDGERS WITH CONFIDENTIAL ASSETS AND INTER-ASSET AUDITING CAPABILITIES

RELATED APPLICATIONS

This application claims priority to, and the benefit of, Greek Patent Application Number 20230101083 filed Dec. 28, 2023, the disclosure of which is hereby incorporated, by reference, in its entirety.

BACKGROUND OF THE INVENTION

1. Field of the Invention

Embodiments relate to zero-knowledge distributed ledgers with confidential assets and inter-asset auditing capabilities.

2. Description of the Related Art

Distributed ledgers, such as blockchains, are in many cases public, which means that all values and assets are visible in order to verify and validate the transaction with a consensus mechanism. For financial institutions, data protection and privacy is a priority, and cannot be distributed or decentralized. Homomorphic encryption and zero knowledge proofs technology has enabled the capability to make a transaction encrypted and private but still be validated with associated proofs. For financial institutions, however, auditing of a private ledger is complex, and must be solved without decrypting the data.

Recently, solutions based on zero knowledge proofs frameworks have shown a promising direction to validate confidential data of the ledger. The technology has rapidly developed during the last decade with several advanced frameworks for general proofing systems, zkSnark for short and general proofing, zkStark for transparent proofs and Bulletproofs for batching range proofs.

These protocols are currently being applied to enhance the privacy, but mostly are being applied to public blockchain domain and not addressing financial institutes applications such as inter-banks blockchain. In the financial industry, which is natively centralised, adapting blockchain also offers several advantages, such as reducing of post-trades processing, laborious auditing, shifting to distributed clouds, and enabling nearly instant approval of transaction contracts. However, in that regulated and audited environment, data protection and privacy clashes with the demand for auditing security and financial risks. Hence, auditing is an additional requirement added on top of the principal validation of a ledger.

Distributed Ledgers, such as blockchains, are in many cases public, which means that all values and assets are visible in order to verify and validate the transaction with a consensus mechanism. For financial institutions, data protection and privacy is a priority, and cannot be distributed or decentralized. Homomorphic encryption and zero knowledge proofs technology has enabled the capability to make a transaction encrypted and private but still be validated with associated proofs. For financial institutions, however, auditing of a private ledger is complex, and must be solved without decrypting the data.

SUMMARY OF THE INVENTION

Zero-knowledge distributed ledgers with confidential assets and inter-asset auditing capabilities disclosed.

According to an embodiment, a method may include: (1) generating, by a broadcaster computer program, for each participant in a network in a transaction, a commit, an audit token, and a proof of consistency; (2) broadcasting, by the broadcaster computer program, the commits, the audit tokens, and the proofs of consistency for each participant to all participants in the network; (3) generating, by the participant computer program for each participant, complimentary commits, complimentary audit tokens, complementary proofs of consistency, proofs of equivalency, and a proof of assets; (4) receiving, by the broadcaster computer program and from each of the participant computer programs, the proof of assets, the complimentary commit, the complimentary audit token, the complementary proof of consistency, and the proof of equivalency; (5) verifying, by the broadcaster computer program and/or the participant computer programs, the proofs of assets, the proofs of balance, the proofs of consistency, and the proofs of equivalency; and (6) approving, by the broadcaster computer program, the transaction based on the verification.

In one embodiment, the method may also include generating, by the broadcaster computer program, for each asset in a transaction, a commit, an audit token, and a proof of consistency.

In one embodiment, the broadcaster computer program further selects for each participant, a random point, wherein the commit may be based on the random point, an asset value for the participant, and two random number generators of a cyclic group.

In one embodiment, the method may also include signing, by the broadcaster computer program, the random point with the audit token.

In one embodiment, the method may also include: verifying, by a participant computer program for each participant, its proof of consistency; and generating, by the participant computer program for each participant, a commit and a token pair.

In one embodiment, the participant computer program verifies its proof of consistency by extracting an integer value from its audit token and commit.

In one embodiment, the approval may be based on a consensus of the participants.

In one embodiment, the verification of the proofs of assets requires the complementary commits and the complimentary audit tokens from each participant.

In one embodiment, the verification of the proofs of assets requires the commits and the audit tokens for each participant.

In one embodiment, the verification of the proofs of balance requires the commits and the audit tokens for each participant.

According to another embodiment, a system may include: a broadcaster computer program executed at one of a plurality of nodes in a network; and a plurality of participant computer programs, each participant computer program executed by a participant node for a participant in the network. The broadcaster computer program may be configured to generate, for each of the participants in a transaction, a commit, an audit token, and a proof of consistency and to broadcast the commits, the audit tokens, and the proofs of consistency for each participant to all participants in the network. The participant computer programs may be configured to generate complimentary commits, complimentary audit tokens, complementary proofs of consistency, proofs of equivalency, and a proof of assets. The broadcaster computer program may be configured to receive, from each of the participant computer programs, the proof of assets, the complimentary commit, the complimentary audit token, the complementary proof of consistency, and the proof of equivalency. The broadcaster computer program and/or participant computer programs may be configured to verify the proofs of assets, the proofs of balance, the proofs of consistency, and the proofs of equivalency. The broadcaster computer program may be configured to approve the transaction based on the verification.

In one embodiment, the broadcaster computer program may be further configured to generate, for each asset in a transaction, a commit, an audit token, and a proof of consistency.

In one embodiment, the broadcaster computer program may be further configured to select, for each participant, a random point, wherein the commit may be based on the random point, an asset value for the participant, and two random number generators of a cyclic group.

In one embodiment, the broadcaster computer program may be further configured to sign the random point with the audit token.

In one embodiment, participant computer program may be further configured to verify, for each participant, its proof of consistency, and to generate, for each participant, a commit and a token pair.

In one embodiment, the participant computer program may be configured to verify its proof of consistency by extracting an integer value from its audit token and commit.

In one embodiment, the approval may be based on a consensus of the participants.

In one embodiment, the verification of the proofs of assets requires the complementary commits and the complimentary audit tokens from each participant.

In one embodiment, the verification of the proofs of assets requires the commits and the audit tokens for each participant.

In one embodiment, the verification of the proofs of balance requires the commits and the audit tokens for each participant.

According to one embodiment, confidential assets with zero knowledge provides a framework for distributed private ledger with auditing capabilities.

In embodiments, a private solution for an encrypted ledger in Decentralized Finance (DeFi) applications with no-trusted setup, and non-interactive proofs are disclosed.

Embodiments may provide auditing capabilities, such as liquidity/capital-risk/credit of confidential assets, a proof of ratio of transactions for coupon/interest rate payment, etc.

Embodiments may be used with a blockchain-based ledger.

Embodiments may involve multiple assets in a single transaction scheme.

Embodiments may provide increased performance due to the proposed transaction scheme where each participant calculates its own range proofs which is the rate limiting step.

Embodiments may remove a complex requirement of "OR" proof due to the proposed transaction scheme and confidential assets.

Embodiments may provide multi-asset, confidential asset exchange with single transaction, thereby removing the need for an assets swap mechanism such as locking an asset during the swap.

Embodiments may remove the latency required to generate proofs for all participants in a transaction as the proofs are created asynchronously by the participants.

Embodiments may disclose a transaction scheme to deal with dropping parties by compromising only on the transaction graph privacy.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts a method for using zero-knowledge distributed ledgers with confidential assets and inter-asset auditing capabilities according to an embodiment;

DETAILED DESCRIPTION OF PREFERRED EMBODIMENTS

Embodiments relate to zero-knowledge distributed ledgers with confidential assets and inter-asset auditing capabilities.

Embodiments may provide auditing capabilities, such as for auditing liquidity, credit, capital risk, and without decrypting any data.

In embodiments, the distributed ledger may be based on zero-knowledge proofs for inter-parties application. Distributed ledger based on zero-knowledge proofs are disclosed in, for example, Neha Narula, "zkLedger: Privacy-Preserving Auditing for Distributed Ledgers," NSDI '18: Proceedings of the 15th USENIX Conference on Networked Systems Design and Implementation, pages 65-80 (2018), the disclosure of which is hereby incorporated, by reference, in its entirety. Embodiments may provide confidential multi-asset capabilities with no trusted setup, which results in a distributable homomorphic encrypted ledger with a three dimension data table structure that enables inter-assets auditing proofs.

For example, embodiments may allow for the audit of a financial institution's liquidity, loans, etc. without violating its privacy or that of another party. As another example, embodiments may be used to ensure an honest coupon rate payment, or liquidity proofs between assets, in the bond or debit market.

Embodiments may provide parallel computing for generating proofs or approving proofs, and may use "bulletproofs" for range proofs to overcome performance issues involved with multi-assets and a large number of participants. Bulletproofs are disclosed in Benedikt Bunz, "Bulletproofs: Short Proofs for Confidential Transactions and More," 2018 IEEE Symposium on Security and Privacy (SP), pp. 315-334 (2018), the disclosure of which is hereby incorporated, by reference, in its entirety.

Examples of proofs that may be provided may include (and similar to zkLedger): proof of balance (e.g., no creation/destruction of assets in a transaction); proof of assets (e.g., transferring bank has enough assets); proof of consistency (e.g., proves consistency of transaction/ledger); Pedersen commit (com); audit token (e.g., Shnorr Signature (public-key, r), where the owner of a column can verify r against the commit); etc. In embodiments, transactions may only be accepted if all proofs are correct. A proof of consistency is an algorithm that allows the prover to provide the proof that shows that the information is identical and consistent on both cryptographic primitives (or algorithms) without revealing the specific details of the data.

As used herein, a commit is a cryptographic primitive that allows one to commit to a chosen value or statement while keeping it hidden but with the ability to reveal the committed value.

Figure 1:
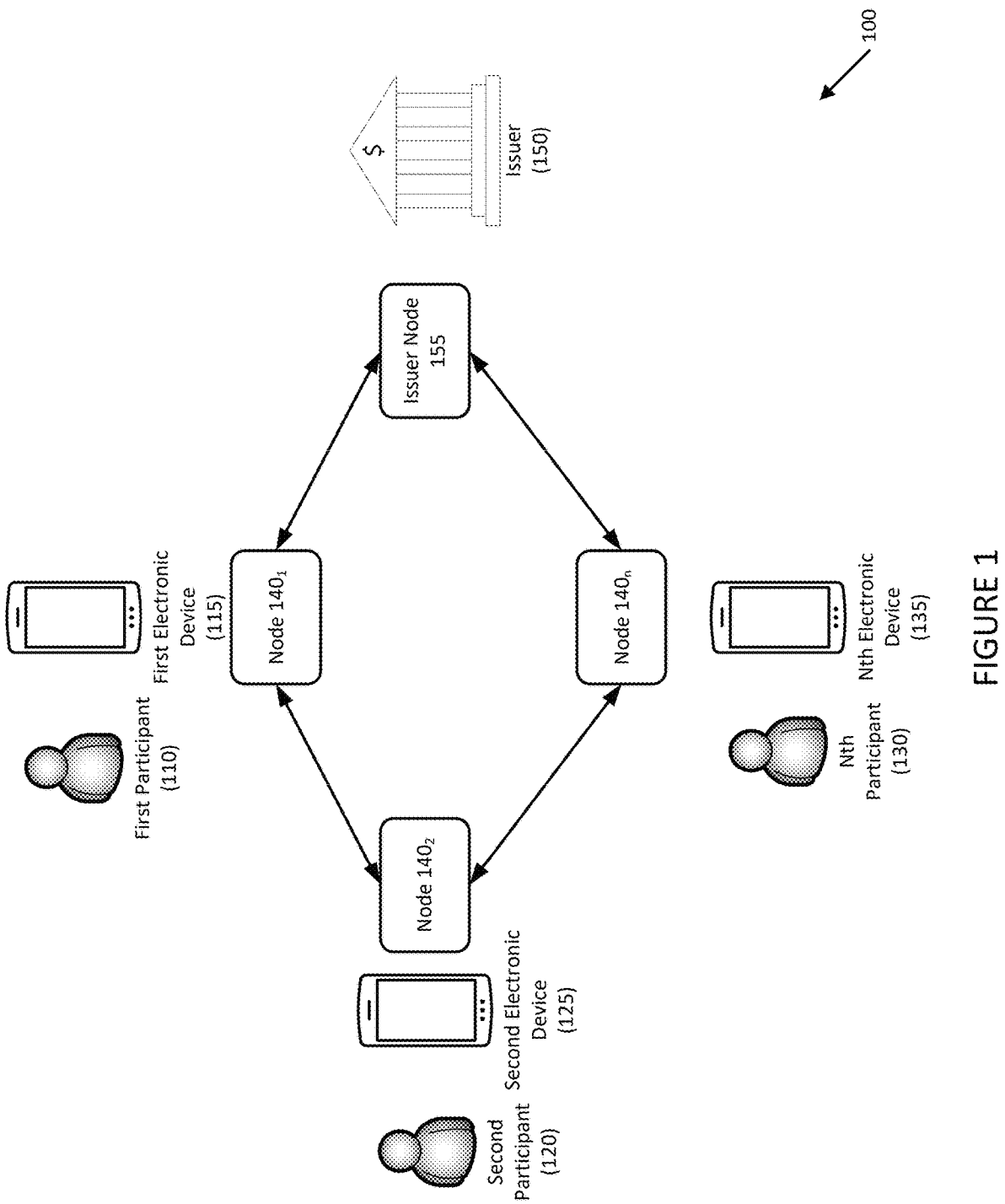
FIG. 1 illustrates a system of zero-knowledge distributed ledgers with confidential assets and inter-asset auditing capabilities according to an embodiment.

Referring to FIG. 1, a system of zero-knowledge distributed ledgers with confidential assets and inter-asset auditing capabilities according to an embodiment. System 100 may include a plurality of nodes for participants (e.g., first participant 110, second participant 120, nth participant 130, etc.). Each participant 110, 120, 130, may be associated with a node (e.g., 140$_1$, 140$_2$, 140$_n$) in a distributed ledger network.

Each participant 110, 120, 130 may be associated with an electronic device (e.g., 115, 125, 135). Electronic devices 115, 125, 135 may be any suitable electronic device, including computers (e.g., workstations, desktops, laptops, tablets, etc.), smart devices (e.g., smartphones, smart watches, etc.), Internet of Things devices, etc.

One of participants 110, 120, 130 may be a broadcaster. For example, the broadcaster may be the participant that wishes to make the transaction, a broker that makes the transaction on behalf of another participant, etc. Note that this cannot be done in zkLedger.

Issuer 150 may participate in the distributed ledger network via issuer node 155.

Nodes 140 may include cryptographic binaries and may access a ledger (not shown) using application programming interfaces (APIs). The ledger may be a public ledger. Issuer 150 may further provide storage (not shown).

The cryptographic binaries allow participants 130 to create an encrypted transaction that contains all the necessary proofs. The cryptographic binaries may receive, as inputs, the current state of the ledger, the previous transactions for the participant, and the secret key of the participant, and may use those to create transactions. Thus, for one participant 130 to have a successful interaction with another participant 130, the participant may maintain its own transactions as well as the encrypted public ledger.

In order to initiate a transaction, one participant 130 may use the installed binaries to encrypt the transaction, and may use a API (e.g., a python API) to broadcast the transaction to other participants 130. All participants 130 on the network use the API to receive the broadcasted transaction.

In order to validate the transaction, the other participants 130 may append their own proof of assets and complimentary tokens using the binaries and then communicate using the API. The transaction may be finalized and added to the ledger after approvals.

To enforce the blockchain property of maintaining the state while transactions are in process, hashes may be used to record and verify each event on the ledger. In one embodiment, Ethereum smart contracts may be used. Regardless of the underlying architecture, in general, the broadcaster (e.g., one of participants 130) will broadcast a hash of the transaction that it wants to broadcast, and the other participants 130 may confirm the transaction with the hash and add their own entries (e.g., complimentary commitments and proofs of asset) and may then write their hash of their appended entry along with the consent on the combination of broadcasted hash and appended hash. Once all consents are received, the broadcaster may validate the transaction and append it to the ledger; the ledger may be updated on all nodes that can verify the transaction with the consented hashes.

Complimentary commitments and complimentary auditing tokens are additional primitives that may be used to generate proof of assets from the original commits and tokens.

In embodiments, separate servers may be used to validate and store the transactions depending on the implementation needs.

The ledger may be generated by one of participants 110, 120, 130, issuer 150, and is associated with two generators points, g and h, which are two random number generators of the cyclic group, G, e.g., an elliptic curve. In general, a cyclic group is a group which is equal to one of its cyclic subgroups: $G = \langle g \rangle$ for some element g, called a generator of G. The participant may generate an audit token, such as a Schnorr signature keypair consisting of a secret key (sk) randomly selected in the range [1, n−1] where n is the integer order of G, and public key pk:=h$^{sk}$, and distributes the public key to the ledger.

Audit tokens are used with zkLedgers to audit known assets.

In one embodiment, the public key for participants 110, 120, 130 may be the account address of the respective participant 110, 120, 130. The public key may be generated by participant 110, 120, 130 choosing a random x-point on an elliptic curve to be its secret key, sk.

Issuer 150 may register participants 110, 120, 130 to the ledger by registering and/or certifying public keys.

The issuer ledger may be a cloud-based microservice, a blockchain smart contract, or any platform with storage for a ledger with versioning and management controls.

Referring to FIG. 2, a method for using zero-knowledge distributed ledgers with confidential assets and inter-asset auditing capabilities is disclosed according to one embodiment.

The participants can send and receive proofs or broadcast transactions from ledger using the endpoint communication address of the ledger.

In step 205, for each participant p in a transaction, a broadcaster computer program executed by one of the participants may generate a random point $r_p$, an integer value $v_p$, a Pedersen commit $cm_p$, an audit token $tk_p$, and a proof of consistency $$\pi_p^C.$$

For example, for each participant, the broadcaster computer program may select a random point r and may generate the commit as follows:

$$cm(v, r) = g^v h^r$$

where g and h are two random number generators of the cyclic group G, and v is the asset value to hide for the participant, r, v∈[0 . . . q] where q is the number of elements in G, q=|G|. The commits are perfectly hiding, as for every v'≠v a solution, cm(v, r)=cm(v', r') also exists.

The random point may be uniformly random value. It may be defined that that r∈$\mathbb{Z}_q$, where q is a large prime number.

In one embodiment, the broadcaster computer program may do the same for each asset.

For each commit in the ledger, the audit token tk is used to sign the random point r on a public key, which represents the generated point on the elliptic curve:

$$tk(r, \text{pk}) = \text{pk}^r$$

By introducing token tk, the pairs (cm, tk) are computationally hiding, because adversary needs to solve $\log_{pk} tk$ to obtain the correct r and then can open the cm. Here, a public key for every participant $\text{pk}_p$ represents the account address of a participant p. It is generated by the participant choosing a random x-point on an elliptic curve to be its secret key, $\text{sk}_p$. Then, a participant uses its secret key, sk, and the ledger generator, h to obtain:

$$\text{pk} = h^{sk}$$

Audit token tk token has two roles. For example, it may be used for auditing, and it may be used by a participant to verify its spending or receiving values in commits without knowledge of the random point r. For example, participant p can take a commit cm(v, r) and $tk^{pk,r}$, which is either committed by itself or by others, and with its secret-key, can calculate $cm^{sk}/tk$ to obtain $g^v$. Participant p can then validate v, or find v by a brute-force approach. This enables committing a value for a participant without interaction with the participant.

In step 210, the broadcaster computer program broadcasts the commit $cm_p$, the audit token $tk_p$, and proof of consistency $$\pi_p^C$$

for each participant and for each asset to all participants.

For example, in a system that includes three participants, an exchange of x units of asset A for y units of asset B from participant $P_A$ to participant $P_B$ may be executed with the encrypted structure:

$$\{\{[cm(-x, r1), tk(r1), \pi_c^{r1}],$$
$$[cm(x, r2), tk(r2), \pi_c^{r2}], [cm(0, r3), tk(r3), \pi_c^{r3}]\},$$
$$\{\{[cm(y, r4), tk(r4), \pi_c^{r4}],$$
$$[cm(-y, r5), tk(r5), \pi_c^{r5}], [cm(0, r6), tk(r6), \pi_c^{r6}]\}\}$$

The broadcasting may be done to a ledger API, or directly to the participants.

In step 215, each participant may receive a transaction from the distributed ledger. In one embodiment, the node for each participant may provide the transaction to the participant.

In step 220, each participant uses its key, sk, to extract its value v with brute force approach, and verify its proof of consistency $\pi^C$.

In order to broadcast a transaction, any participant can generate a commit and token pairs for each participant as:

$$Tx_t = \{cm_{t,a,p}, tk_{t,a,p}, \pi_{t,a,p}^C\}$$

The commit holds the value, the token signs random point r that was used in the commit, and the $$\pi_{t,a,p}^C = \pi^C(r_{t,a,p}, cm_{t,a,p}, tk_{t,a,p})$$

is a Non-Interactive Zero-Knowledge (NIZK) proof such that the random point r in the token matches the random point r in the commit. The Σ-protocol is constructed with Maurer's main protocol definition and non-interactive challenge.

For example, let $g^v h^r$, $tk = \text{pk}^r$ $\psi$: $Z^P \rightarrow G^2$: (v, r)$\rightarrow$($g^v h^r$, $\text{pk}^r$). For a given challenge $c \in Z_p$, the prover chooses random $u_1, u_2 \leftarrow Z_p$, and sets $t_1 \leftarrow u_1 g + u_{2h}$, $t_2 \leftarrow u_2 \text{pk}$, $s-1 \leftarrow u_1 + cv$, $s_2 \leftarrow u_2 + cr$. It then outputs the simulated transcript ($t_1$, $t_2$, $s_1$, $s_2 c$). The verifier verifies: $\{t_1 + c \cdot cm = s_1 g + s_2 h \wedge t_2 + tk = s_2 h\}$ In step 225, each participant may generate its proof of assets $$\pi_p^A$$

using its balance and range proof $$r_p'.$$

In order to verify that each participant has enough asset to carry out the transaction, a range proof is required over the column on the sum of the commits of each participant including the proposed transaction. In one embodiment, the broadcaster computer program may choose to use the sender as the prover of the assets for all participants in the transaction. This has the advantage of injective transaction that does not require the other participant to communicate any proofs. This may also limit the scope of the ledger.

In step 230, each participant generates complementary Pedersen commits $$cm_p',$$

complimentary audit tokens $tk'_p$, complementary proofs of consistency $$\pi_p^{C'},$$

and proofs of equivalency $$\pi_p^{Eq}$$

using its $r_p'$.

9

10

The proof of equivalency $$\pi_p^{Eq}$$

may be used in the transaction scheme to show that two commits have the same value. In ZKLedger, this is used only for auditing, embodiments, however, only need to prove that a commit broadcasted and a complementary commit have the same value, v. The validation of the equivalence proof firstly enables the participant to generate its own range proof, and secondly, proving that the participant knows the value v. Embodiments may also use the proof of equivalency in the auditing proofs.

In step 235, if consistent, each participant sends to the ledger server/node its proof of assets $$\pi_p^A$$

with its complementary Pederson commit cm'$_p$, complimentary audit token $$tk_p',$$

complementary proof of consistency $$\pi_p^{C'},$$

and proof of equivalence $$\pi_p^{Eq}.$$

In step 240, the broadcaster and parties computer program may verify the proofs (e.g., the proof of asset, proof of balance, proofs of consistency, and proof of equivalence, the proof of asset also requires the complementary commit and tokens for the proof). Once verified, the broadcaster computer program may notify the ledger service/system in order to approve the transaction. The approval of transaction may involve a consensus of all parties approving the transaction or any other suitable consensus mechanism.

Any suitable consensus mechanism may be used, including participant voting.

At an appropriate point, embodiments may validate dropped parties. For example, dropped parties may cause some range proofs to be not valid or not filled. In such cases, the broadcaster may exclude the dropped parties and the transaction can be still validated.

In embodiments, the broadcaster may regenerate its cell in the private ledger with a random point $r_b$, referred to as a "blinding factor," that is the sum of the excluded participants and itself.

$$r_{t,k,b} = r_{t,k,b}^{org} + \sum_{o \in O} r_{t,k,o}$$

This makes the proof of balance valid again.

Figure 3:
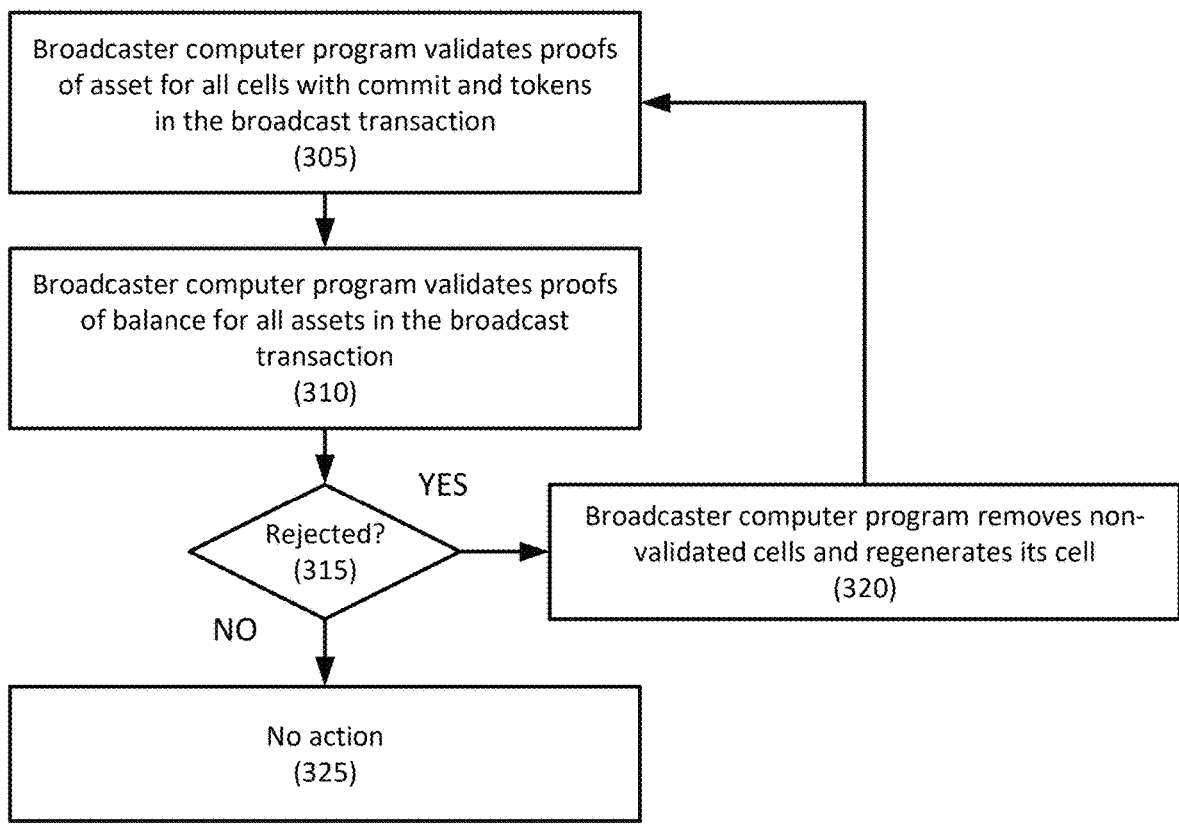
FIG. 3 depicts a method for validating dropped parties according to an embodiment.

The broadcaster may be able to remove any participant as long as the commit value to the transaction is 0. Otherwise, the proof of balance fails. The trade-off here is privacy of the transaction graph—if there are fewer participants involved in the transaction, more information on the transaction graph may be extracted. A method is provided in FIG. 3.

In step 305, the broadcaster computer program may validate the proofs of asset for all cells with commits and tokens in the broadcast transaction.

In step 310, the broadcaster computer program may validate the proofs of balance for all assets in broadcast transaction.

In step 315, if any cell with proofs in the validations are rejected, in step 320, the broadcaster computer program may remove non-validated cells, and regenerate only its cell in the transaction, and send only to validation process again.

If no cells are rejected, in step 325, no action may be taken.

Embodiments may involve auditing the asset balance. Auditing any asset balance may be done by proving the equivalence between the product of commitments signed by secret key and the product of tokens. For example, participant p may claim balance for asset a, $\Sigma v_{a,p}$ with an auditor. The auditor may calculate:

$$\prod_{t \in Txs}^{Np} cm_{p,a,t} / \left(g^{\Sigma v}\right) := c_1$$

$$\prod_{t \in Txs}^{Np} tk_{p,a,t} := c_2$$

Then the participant proves the equivalence:

$$d\log_{c_1} c_2 \stackrel{?}{=} d\log_h pk_p$$

and may verify $c_1$ and $c_2$.

Embodiments may involve providing asset liquidity. For a given rational number, $f \in \mathbb{Q}$, participant, p may prove for asset, a*:

$$\frac{\sum_t v_{p,a^*,t}}{\sum_{a \in A} \sum_{t \in Txs} v_{pa,a,t}} < f$$

From the ledger, the prover and verifier may calculate two points:

$$\prod_t cm'_{p,a^*,t} := c_1, \prod_{a \in A} \prod_t cm'_{p,a,t} := c_2$$

The verifier may provide two integers, D, N such that D/N=f, and the prover may prove the range proof:

$$c_2^D - c_1^N > 0$$

In DeFi applications, transactions for multiple investors may consider interest rates, and the rates may be proved as part of transaction verification process or for auditing purposes using Sigma protocols proofs between cells in the ledger. For example, for a given rational fraction, $f \in \mathbb{Q}$, participant, p, may prove for asset a that:

$$\frac{\sum_{t \in txs_1 \subset T} v_{p,a,t}}{\sum_{t \in txs_2 \subset T} v_{p,a,t}} = \text{Rate}$$

The verifier may provide two integers, D, N such that D/N=Rate. The prover and verifier may calculate from the ledger:

$$\prod_{t \in txs_1} cm_{p,a,t} := c_1, \quad \prod_{t \in txs_2} tk_{p,a,t} := \tau_1$$

$$\prod_{t \in txs_1} cm_{p,a,t} := c_2, \quad \prod_{t \in txs_2} tk_{p,a,t} := \tau_2$$

and then prover may prove the equivalence of d log solution:

$$d\log_{c_1} c_1^{sk} \stackrel{?}{=} d\log_{c_2} c_2^{sk}, \text{ and verifies: } \left(c_1^{sk} / \tau_1\right)^N = \left(c_2^{sk} / \tau_2\right)^D$$

Figure 4:
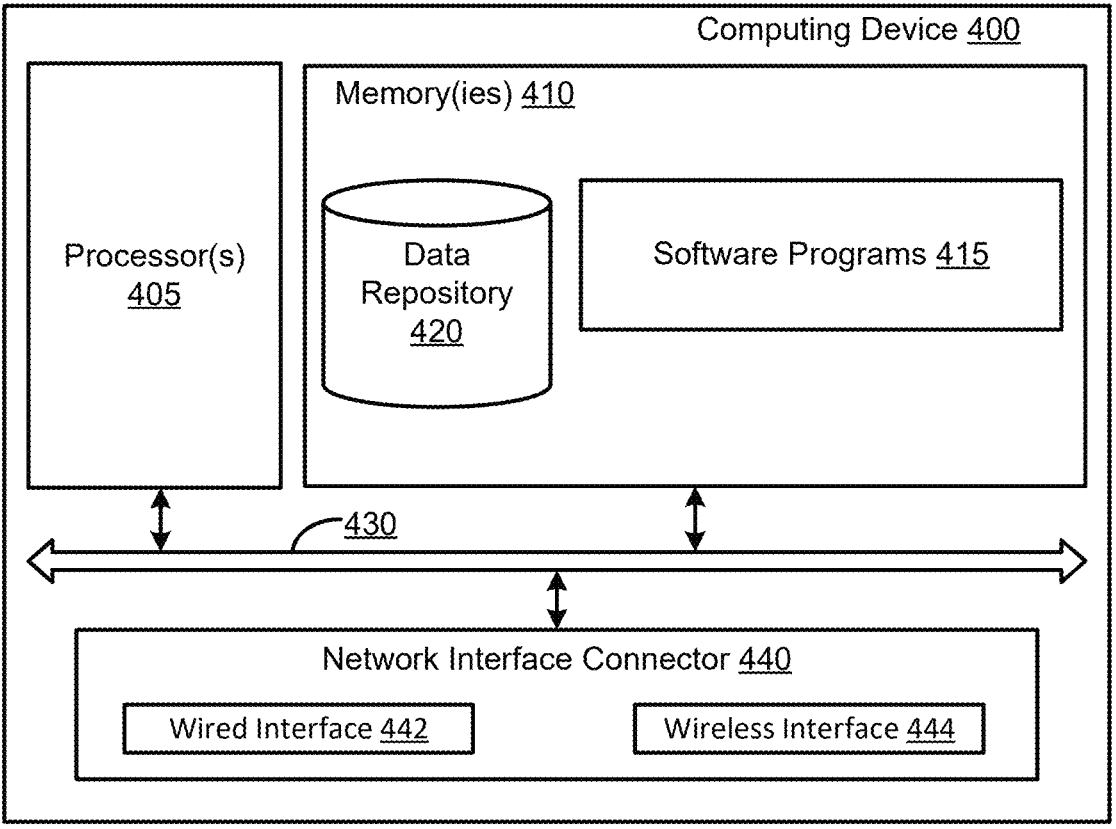
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
generating, by a broadcaster computer program, for each participant in a network in a transaction involving an exchange of assets among the participants that are owners of the assets, a commit, an audit token, and a proof of consistency, wherein the proof of consistency proves that the transaction is consistent with a distributed ledger;
broadcasting, by the broadcaster computer program, the commits, the audit tokens, and the proofs of consistency for each participant to all participants in the network;

generating, by the participant computer program for each participant, complimentary commits, complimentary audit tokens, complementary proofs of consistency, proofs of equivalency that show that the commits have the same value, and a proof of assets that proves that a transferring bank has sufficient assets for the transaction;

receiving, by the broadcaster computer program and from each of the participant computer programs, the proof of assets, the complimentary commit, the complimentary audit token, the complementary proof of consistency, the proof of equivalency;

verifying, by the broadcaster computer program and/or the participant computer programs, that each participant has sufficient assets for the transaction based on the proofs of assets, that the proof of consistency and the complimentary proof of consistency are consistent, and the commit and the complimentary commit have the same value based on the proofs of equivalency; and approving, by the broadcaster computer program, the transaction based on the verification.

2. The method of claim 1, further comprising:

generating, by the broadcaster computer program, for each asset in a transaction, a commit, an audit token, and a proof of consistency.

3. The method of claim 1, wherein the broadcaster computer program further selects for each participant, a random point, wherein the commit is based on the random point, an asset value for the participant, and two random number generators of a cyclic group.

4. The method of claim 3, further comprising:

signing, by the broadcaster computer program, the random point with the audit token.

5. The method of claim 1, further comprising:

verifying, by a participant computer program for each participant, its proof of consistency; and generating, by the participant computer program for each participant, a commit and a token pair.

6. The method of claim 5, wherein the participant computer program verifies its proof of consistency by extracting an integer value from its audit token and commit.

7. The method of claim 1, wherein the approval is based on a consensus of the participants.

8. The method of claim 1, wherein the verification of the proofs of assets requires the complimentary commits and the complimentary audit tokens from each participant.

9. The method of claim 1, wherein the verification of the proofs of assets requires the commits and the audit tokens for each participant.

10. A system comprising:

a broadcaster computer program executed by a computer processor at one of a plurality of nodes in a network;

a plurality of participant computer programs, each participant computer program executed by a computer processor at a participant node for a participant in the network;

wherein:

the broadcaster computer program is configured to generate, for each of the participants in a transaction involving an exchange of assets among the participants that are owners of the assets, a commit, an audit token, and a proof of consistency, wherein the proof of consistency proves that the transaction is consistent with a distributed ledger;

the broadcaster computer program is configured to broadcast the commits, the audit tokens, and the proofs of consistency for each participant to all participants in the network;

the participant computer programs are configured to generate complimentary commits, complimentary audit tokens, complimentary proofs of consistency, proofs of equivalency that show that the commits have the same value, and a proof of assets that proves that a transferring bank has sufficient assets for the transaction;

the broadcaster computer program is configured to receive, from each of the participant computer programs, the proof of assets, the complimentary commit, the complimentary audit token, the complementary proof of consistency, and the proof of equivalency;

the broadcaster computer program and/or participant computer programs are configured to verify that each participant has sufficient assets for the transaction based on the proofs of assets, that the proof of consistency and the complimentary proof of consistency are consistent, and the commit and the complimentary commit have the same value based on the proofs of equivalency; and the broadcaster computer program is configured to approve the transaction based on the verification.

11. The system of claim 10, wherein the broadcaster computer program is further configured to generate, for each asset in a transaction, a commit, an audit token, and a proof of consistency.

12. The system of claim 10, wherein the broadcaster computer program is further configured to select, for each participant, a random point, wherein the commit is based on the random point, an asset value for the participant, and two random number generators of a cyclic group.

13. The system of claim 12 wherein the broadcaster computer program is further configured to sign the random point with the audit token.

14. The system of claim 10, wherein participant computer program is further configured to verify, for each participant, its proof of consistency, and to generate, for each participant, a commit and a token pair.

15. The system of claim 14, wherein participant computer program is configured to verify its proof of consistency by extracting an integer value from its audit token and commit.

16. The system of claim 10, wherein the approval is based on a consensus of the participants.

17. The system of claim 10, wherein the verification of the proofs of assets requires the complimentary commits and the complimentary audit tokens from each participant.

18. The system of claim 10, wherein the verification of the proofs of assets requires the commits and the audit tokens for each participant.

19. The system of claim 10, wherein the verification of the proofs of balance requires the commits and the audit tokens for each participant.

* * * * *